United States Patent [19]

Arhelger

[11] Patent Number: 4,808,229

[45] Date of Patent: Feb. 28, 1989

[54] ASBESTOS-FREE BUILDING MATERIAL PLATES AND METHOD OF MAKING SAME

[75] Inventor: Wolfgang Arhelger, Haiger, Fed. Rep. of Germany

[73] Assignee: Baierl & Demmelhuber GmbH & Co. Akustik & Trockenbau KG, Fed. Rep. of Germany

[21] Appl. No.: 801,150

[22] PCT Filed: Mar. 15, 1985

[86] PCT No.: PCT/EP85/00105

§ 371 Date: Nov. 15, 1985

§ 102(e) Date: Nov. 15, 1985

[87] PCT Pub. No.: WO85/04165

PCT Pub. Date: Sep. 26, 1985

[30] Foreign Application Priority Data

Mar. 15, 1984 [DE] Fed. Rep. of Germany ..... 34095977

[51] Int. Cl.$^4$ ................................................. C04B 7/02
[52] U.S. Cl. .......................................... 106/90; 106/93; 106/99
[58] Field of Search .............................. 106/90, 93, 99

[56] References Cited

U.S. PATENT DOCUMENTS 4,132,555  1/1979  Barrable ................................. 106/90
4,306,911  12/1981  Gordon et al. ........................ 106/99
4,406,703  9/1983  Guthrie et al. ........................ 106/99

FOREIGN PATENT DOCUMENTS 49-118719  11/1974  Japan ..................................... 106/99
2101645  1/1983  United Kingdom .................. 106/99

*Primary Examiner*—William R. Dixon, Jr.
*Assistant Examiner*—Ann M. Knab
*Attorney, Agent, or Firm*—Dennison, Meserole, Pollack & Scheiner

[57] ABSTRACT

A building material plate formed by compression in the hydration-water moist state and having quality features resembling asbestos-reinforced cement and made of an asbestos-free material mixture having up to 30 vol. % of cellulose fiber proportions in the high-packed state of a diameter spectrum $D_C$, singly bound into a hydration binder particle mixture still present in the moist forming state of a grain size-main distribution spectrum $D_o$ within the ratio range $$0.9 \leq D_C/D_o \leq 1.1,$$

which in case of a participation of cement in the binder contains special additives showing a pozzuolana reaction for securing constancy in longterm quality.

15 Claims, 5 Drawing Sheets

ASBESTOS-FREE BUILDING MATERIAL PLATES AND METHOD OF MAKING SAME

The invention relates to building material plates made of an asbestos-free material mixture and to an economical method guaranteeing constancy in quality for making the same.

It is known to use EFA-binder additives for concrete building. In case of EFA-binder additives the electrofilter-draw-off (called EFA in the following) of combustion residues in the exhaust systems of high temperature coal dust firings are concerned. Up to now, such EFA-fillers have already been employed in concrete building so as to e.g. reduce hydration heat during the setting of concrete, to prevent the formation of microcracks in the cement stone or to increase the final strength and watertightness of the cement stone and its acid resistance. Dependent on the dosage of the EFA-filler, the Ca-$(OH)_2$ crystals occurring in the cement stone and having low strength are transformed into calcium silicate hydrates substantially determining the strength of the cement stone. Less strong tetracalciumaluminate hydrates interspersed by $Fe_2O_3$ incorporations and monosulfates may be formed, as well.

The lifetime of fibers sensitive to lye is substantially increased by the far-reaching neutralization of $Ca(OH)_2$ in i.a. cement-combined building material plates compounded with EFA-binder.

It is the object of present invention to make building material plates from an asbestos-free material mixture, which as regards their longterm and lifetime properties, such as resistivity to fire and stress receptivity, are as far as possible equal to asbestos-reinforced plates.

In the mixing and shaping phase, the mixture of material for instance comprises cement clinker particles ($Z$) of specialized grinding fineness; the mixing water ($W_Z$) required for their hydration crystal formation; fiber reinforcing substances of specific size distribution characteristic, which, in addition to fillers that do not impede cement hydration, contain cellulose fibers (C fibers); and so-called EFA minimum-sized glass bead additives (E). These additives maintain long term quality; wwith the admixture of additional ($W_E$), they react in Pozzuolana-like fashion with the $Ca(OH)_2$ crystals that among others are produced in the cement stone. If sufficient EFA and W are added, the EFA additives largely convert these crystals into the calcium silicate hydrates that actually effect the strength and density of the cement, and in so doing they dissolve completely or in part, or become coated with these calcium silicate hydrate crystals.

In the manufacture of cement plates asbestos has been used up to now as a reinforcing basis, as one knows. Asbestos-reinforced cement plates have manifold excellent properties and can be produced economically. But experience has shown that the men occupied with the manufacture and processing of such asbestos-reinforced cement plates are subjected to a high health risk. To avoid said health risk for men working with fiber-reinforced cement plates a satisfactory substitute for asbestos is being searched for.

In terms of usable bending strengths of the molded building material elements according to the invention, if a limitation to useful bending capacities that are approximately 75% of those of high-strength asbestos cement molded elements is made substantially for the sake of avoiding microscopic fissures in the binder stone, which do not substantially threaten the strength of the stone but negate its watertightness, then the other physical properties (low thermal conductivity, high insulation capacity, a high degree of fire-proofness, very low water absorption capacity, very slight changes in shape from expansion and contraction due to changes in temperature and moisture) attainable with the molded building material elements according to the invention are at least as good as those attainable with asbestos cement molded elements.

In case of fire it is of additional advantage that with e.g. building material plates according to the invention which are employed as wall and ceiling coverings in fire zone limitations, no explosion-type bursting takes place, as one often observes with asbestos fiber cement plates.

The molded building material elements according to the invention are distinguished in that a fiber reinforcement substance mixture of specific size distribution is used as a substitute for asbestos fiber. The substitute mixture contains not only fillers that do not impede cement hydration but also, cellulose fibers (C-fibers) are used, wherein $D_C/D_o$ is between 0.9 and 1.1 and $D_{Cq}/D_o$ is between 1.1 and 1.35, wherein $D_c$ is the diameter of the cellulose fibers air dry, $D_{Cq}$ is the diameter of the cellulose fibers wet-moist and swollen, and $D_o$ is the diameter of the particles of the binders, the diameters being of narrow size distribution. Optionally—only to the extent to which it is necessary for an even further increase of the modulus of elasticity (rigidity), glass fibers (G-fibers) in an essentially lower quantity proportion (1 part by volume glass fibers as against 5 to 6 parts by volume of C/G-mixed fibers in the air-dry state) are contained, the glass fibers having a diameter which is between 0.175 and 0.195 times the diameter of the binder, and between 0.16 and 0.22 times the diameter of the cellulose fibers when air dry. The volume proportion of glass fibers in the material mixture is about 0.05, and the sum of the volume proportions of cellulose fibers when air dry and glass fibers in the mixture is about 0.27 to 0.32, with the sum of the volume proportions of cellulose fibers when water swollen and glass fibers being between about 0.38 and 0.45.

Finally, the molded building material element according to the invention is distinguished in that in proportion to the molded element volume, and depending on the capillary porosity (from 0 to a maximum of approximately 15% by volume, in the applications discussed here) of the binder stone, with compact molding of the mixture of material, notably high fiber mixture fill factors of $0.27 < f_C < 0.32$—or if glass fibers are admixed, (preferably) $0.27 < f_C + f_G < 0.32$, where $f_G \approx 0.05$—are attained, if the volume fill factors of the molded elements, that is, $f_C$ for the C fiber filler component in the air-dry state,
$f_{Bst}$ for the binder stone, and
$f_G$ if necessary for the G fiber component, meet the condition for compact grain, which is $$f_C + f_{Bst} = 1$$

If glass fibers are admixed, then this condition is $$f_C + f_{Bst} + f_G = 1.$$

The volume proportion of the cellulose fibers when dry in the material is between 0.27 and 0.32, and when water swollen is between 0.38 and 0.45.

These notably high fiber mixture fill factors $f_C$ or $f_C+f_G$, with the high long term quality in terms of physical structure and strength that is specified for the molded building material elements according to the invention, are attainable with the necessary homogeneity distribution of the substance mixture components and the exploitation of strength that only such distribution makes possible when the preparation, the stepwise mixing and finally the concluding formation of the substance mixture components in the air-dry to hydration-water-moist state is performed according to the present invention.

BRIEF DESCRIPTION OF THE DRAWINGS

Further features and advantages of the invention may be taken from the attached drawings in which.

DESCRIPTION OF THE PREFERRED EMBODIMENTS

The raw material containing C-fibers (residual and waste wood, inexpensive rapidly growing fresh woods, old waste paper and the like) should be chosen such that by known and suitable crushing and grinding techniques, without any insuperable difficulties owing to the type of material, as far as possible narrow-band distributions of particle size are reproducibly obtained, that in particular the diameter of the single C-fiber $D_C$ contained in the C-fiber heap of debris prepared for the subsequent mixing process can be adjusted in the air-dry resp. $D_{Cq}$ overall area of particle size distribution to e.g. about 40 $\mu$m$<D_C<$110 $\mu$m, or about 50 $\mu$m$<D_{Cq}<$135 $\mu$m, respectively.

Figure 1:
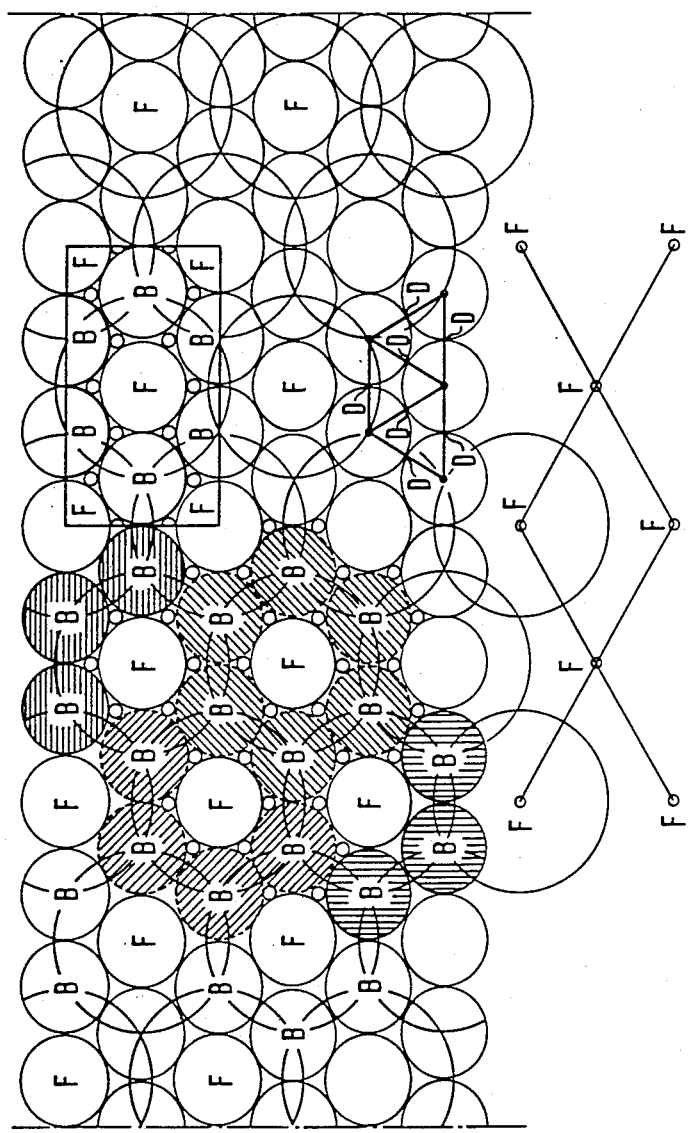
FIG. 1 is a schematic, cross-sectional view showing the packing of particles according to the present invention.
Figure 2:
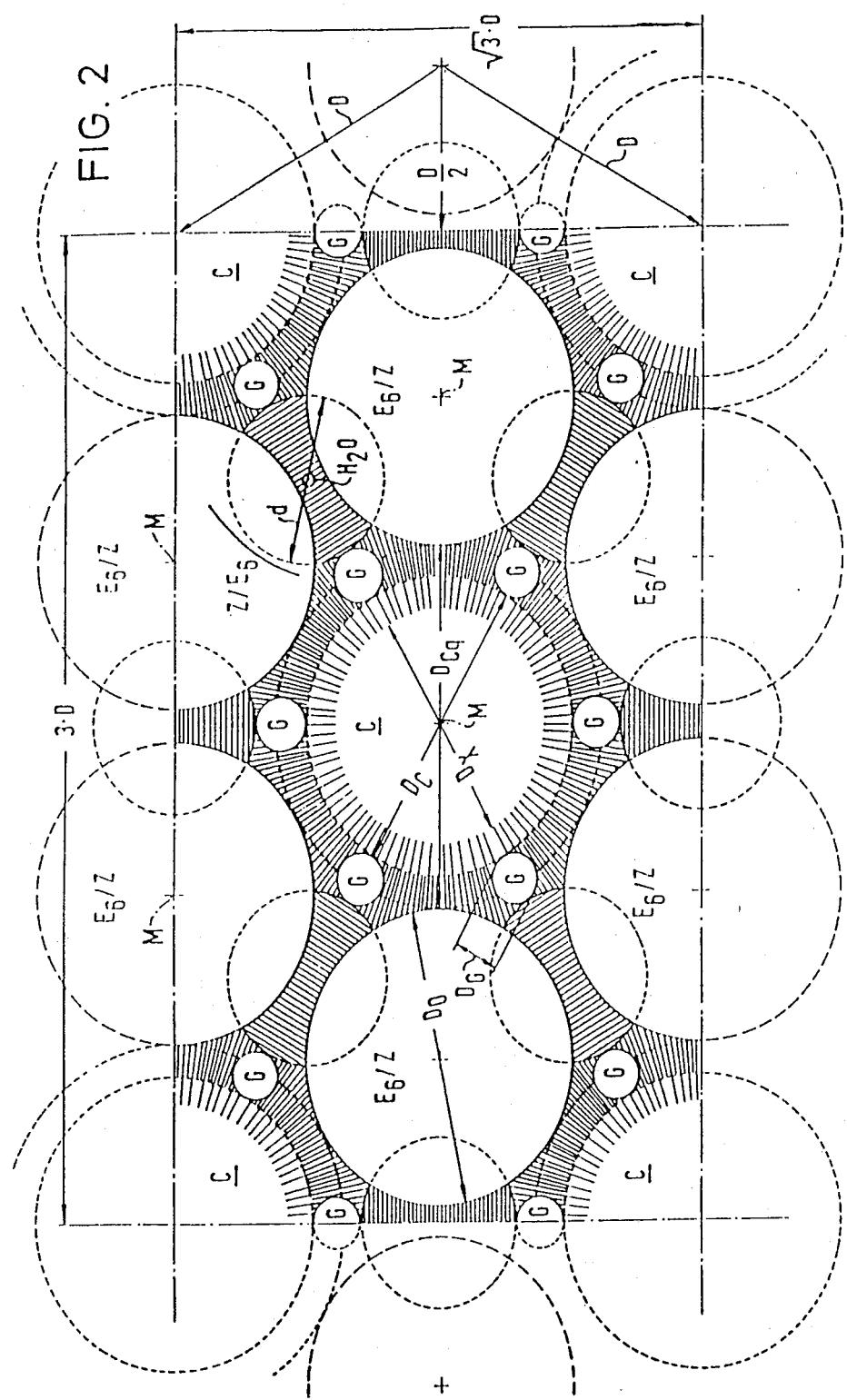
FIG. 2 is a further schematic cross-sectional view of the packing of particles according to the invention.
Figure 3:
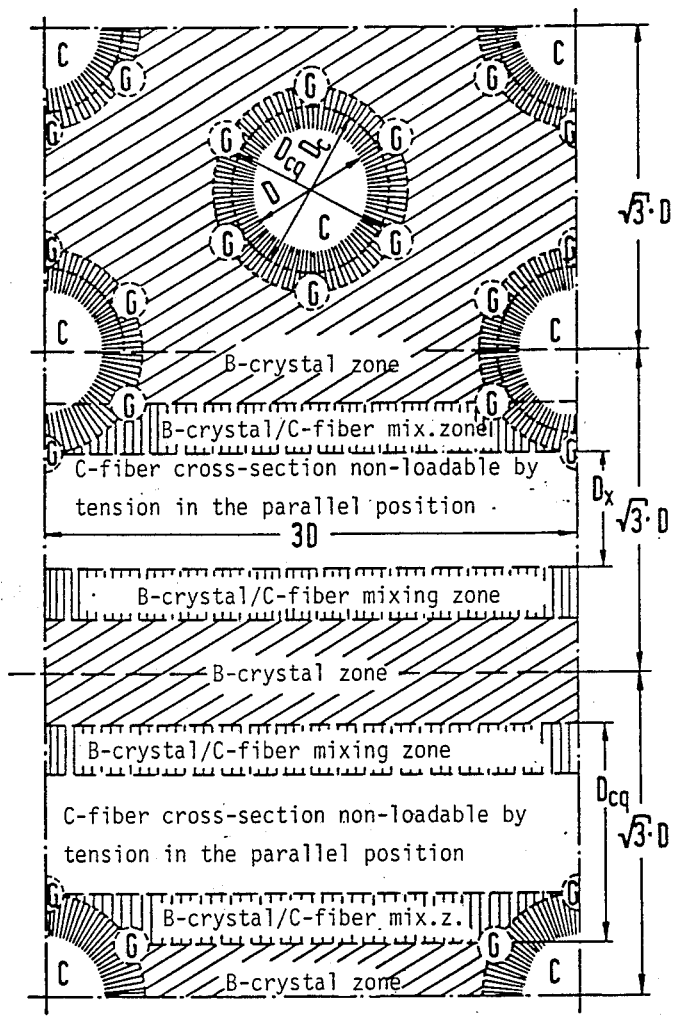
FIG. 3 is a schematic, theoretical cross-section according to FIG. 2 after binder crystallization.

If in conformity with the illustration of disposition of particles of FIG. 1 one assumes an idealized triagonal compactness free from cavities within small volumes of material mixture moist by hydration water, and according to the illustration of disposition of particles of FIG. 2 in even smaller n-fold volume elements $V_S$ for any grain and fiber particles involved along with their encasing water and C-fiber deposit water, the said approaching assumption applies all the more the more narrow-band the diameter distributions $D_C$ resp. $D_{Cq}$ of the C-fibers, $D_G$ of the G-fibers (if there are any) and $D_o$ of the Z- and large EFA-particles are and the closer the coordinations of condition $0.9 < D_c/D_o < 1.1$ i.e.   44 $\mu$m $< D_o <$ 100 $\mu$m
resp. $1.1 < D_{cq}/D_o < 1.35$ e.g. narrow-  70 $\mu$m $< D_o <$ 100 $\mu$m
band   77 $\mu$m $< D_o <$ 75 $\mu$m
or   without EFA-addition and if present:

-continued $0.175 < D_c/D_o < 1.195$
resp. $0.16 < D_c/D_o < 0.22$ $\Big\}$ at $f_G \approx 0.05$ are being kept to, if moreover the addition of hydration water $W_Z=G_{WZ}/G_Z$ expressed by weight proportions of the cement are restricted to the narrow range $0.375 \leq W_Z \leq 0.45$ for cement stone free of capillary pores resp. poor in capillary pores (patent claims 1 and 4 in parts).

At those coordinations of grain size, encasing resp. amount of deposit water and fiber diameter according to the invention the fiber lengths contingent upon the engineering facilities $L_C \approx 1$ mm up to a few mm and if present $L_G \approx 1.5$ mm up to a few mm are sufficiently large that at a successive addition of mixing components homogenizing with respect to distribution and according to the invention and a principally air-dry to hydration-water moist mixing technique a mainly tangential addition of the, if present, few ($f_g=0.05$) thin G-fibers—which addition in small material mixture volumes with volumes in the mm-range is firstly parallel to approximately parallel—to the relatively thick C-fibers is achieved in the mixing procedure. Then, an addition of binder-large particles having a diameter of $$D_o = 1/6 \text{ to } 1/10 \ L_{Cmin}$$

in parallel to the C-fiber strand is to be expected along with their water encasings stable contingent upon the tension of the water surface and having a diameter of encasing cylinder $D=\beta \cdot D_o$ in the subsequent mixing and forming procedures.

It is only the harmonized observation of the rules of procedure according to the invention which in a more or less approach allows at all the model of the disposition of the material mixture for the hydration-water moist, triagonal compact arrangement of parallel C-fiber strands resp.—possibly according to patent claim 6—of C/G-fiber strands having an all around complete encasing by binder-large particles again water-encased for their part and having the diameter $D_o$ in small hydration-water moist volumes of material mixture having dimensions within the mm-range, which, for their part, can be assumed to be composed of again n-fold smaller volume elements $\Delta V_S$, which results from the ideal geometric circumstances, according to the illustration of disposition of particles in FIG. 2 with its classifying system according to the illustration of disposition of particles in FIG. 1.

A particularly advantageous procedure is defined by the use according to the invention of a combination of features. The assumed approximation of the replicable n-fold occurrence of successive rows of combination packed area volume elements $\Delta V_S$, as shown in the grain representation of FIG. 2, is allowable, given relatively large hydration-water-moist volumes of substance mixture with spatial dimensions in the millimeter range, and given that, in small volumes of substance mixture with parallel fibers, the fiber directions change more or less coincidentally, in these distances of a few millimeters, during the wet molding of the building element, depending on the pouring technique, or the directionally oriented layer-trickling technique, used.

To determine the conformity to physical laws of the relative relationship of particle and fiber dimensions as well as substance mixture volume components in the total molded element volume, in order to assure the selective, all-encompassing C/G fiber strand envelopment with central individual C fibers, swollen with absorption of repository water, and large binder particles peripheral to the fiber strand along with the particle jacket water, the geometric conformities can be calculated approximately, and applied to the total volume of the molded element, for the ideal combination accumulation space volume element $\Delta V_S$ in accordance with the grain shown in FIG. 2. The following factors must be known, to perform this calculation: the total volume that is a condition for compact grain; the expected C-fiber swelling $D_{Cq} \approx 1.225 \cdot D_C$; and the triagonal grain equidistance D between the centers of the Z and $E_G$ large particles (approximated by spherical zones of diameter $D_o$ equivalent to the particle volume) and the centers of the C fibers (approximated by circular-cross-section fibers of diameter $D_C$ or $D_{Cq} \approx 1.225 \cdot D_C$). This triagonal grain equidistance D is also advantageous for low-obstruction displaceability of the substance mixture components.

The $\Delta V_S$ model of disposition according to the illustration of disposition of particles in FIG. 2 applies also when the binders include an additive capable of a pozzuolana reaction with Ca(OH)$_2$ crystals, the additive being in the form of very fine glass spheres with about 15% of the quantity of the spheres having a diameter between 40 $\mu$m and 90 $\mu$m, and being approximately equal to the size of the binder particles. About 35% of the quantity of the spheres have a diameter of between 10 and 40 $\mu$m, and about 50% of the quantity of the spheres have a diameter of less than about 10 $\mu$m. Where glass spheres are added, $G_E/G_Z$ may be between 0.16 and 0.20 and $G_E/G_B$ may be between 0.14 and 0.17, where $G_E$ is the weight of the is the weight of the glass spheres, $G_Z$ is the weight of the cement, and $G_B$ is the weight of the hydration binders, with $G_B$ equal to the sum of $G_Z$ and $G_E$. Where glass spheres are added, the Ca(OH)$_2$ crystal phases of the cement are to be transformed later by pozzuolana reaction to a large extent by the addition of EFA-small glass spheres and supplementing hydrating water $W_E$.

If one assumes an average ratio of $G_E/G_Z \approx 0.18$ about 4 of 100 $D_o$ large sphere zones according to FIGS. 1 and 2 are occupied by EFA-large particles, according to data given for EFA with respect to the distribution of quantities and grain sizes given.

Further, if in case of the EFA-addition the largest diameters of the $D_o$-spherical zones according to FIG. 2 are within a range of distribution of 65 $\mu$m $< D_o <$ 90 $\mu$m the large grain Z-particles with about the same distribution of grain size are predominant, the few Z-particles which are by far smaller find their place in the baked state in $D_o$-spherical zones, the C-fibers are appropriately selected in conformity with the invention, at the addition of hydration water, with the weight rate of the water to the cement being between 0.375 and 0.45, any EFA-medium ($E_M$) and EFA-small ($E_K$) particles have room in the cavities suited for housing small spheres (and having the diameter "d"), which are drawn-in in FIG. 2 for the volume element $\Delta V_S$ between $D_o$-sphere zones.

After these principal explanations as regards the approximative validity of the discussed model of disposition of the material mixture in the dense-packed, formed, hydration-water moist state the disposition geometry and the contingent coordination of the volume proportions of the components of material mixture in a volume element $\Delta V_S$ according to FIG. 2, which occurs n-fold (n$\times$3$\times$5$\times$10=150) packed side by side, and one above and behind each other in small volumes of material mixture with dimensions within the mm-range, is described.

The following description proceeds from an addition of glass fibers having a diameter which is between 0.175 and 0.195 times the diameter of the binder, and between 0.16 and 0.22 times the diameter of the cellulose fibers when air dry, the volume proportion of glass fibers in the material mixture being about 0.16 and 0.22 times the diameter of the cellulose fibers when dry, the volume proportion of glass fibers in the material mixture being about 0.05, and the sum of the volume proportions of cellulose fibers when air dry and glass fibers in the mixture being between about 0.27 and 0.32. The sum of the volume proportions of cellulose fibers when water swollen and glass fibers is between about 0.38 and 0.45. In principle, one may also omit said glass fibers. In an application without glass fibers the volume elements designated by G in FIG. 2 are filled by other fine particles—e.g. EFA-finest glass spheres.

The advantage of a glass fiber addition lies in the raise of the E-module, i.e. the rigidity of the building material plate, if necessary.

In the volume element $\Delta V_S$ having the edge lengths $B_S$, $H_S$, $T_S$ the following conditions are valid, expressed by the equidistance of triagonal disposition D according to the illustration of disposition of particles 2, the diameter $D_o$ of the spherical zones, whose volume is meant to be approximately as large as that of the Z- and $E_G$-large particles having grain sizes $\approx D_o$ the diameter $D_C$ resp. $D_{Cq}$ of the air-dry resp. wet-moist swollen C-fibers, the diameter $D < D_{Cq}$ up to which the C-fiber deposit water enters into the C-fiber, the encasing water factors $\alpha$ and $\beta$, for which within the ranges $1 < \alpha < \overline{\beta}$; $1 < \beta < \overline{\beta}$; $\overline{\beta} \approx 1.22$ up to 1.3 particle water encasings stable contingent on the tension of the water surface and having outer encasing diameters "$\alpha \cdot D_o$" resp. "$\beta \cdot D_o$" may be presupposed, the diameter d of the zones of slipping spheres in which in the case of an EFA-addition the medium ($E_M$) and smallest ($E_K$) EFA-particles must be apt to be theoretically housed completely, the diameter $D_G$ of the G-fibers possibly added to the C-fibers, the corresponding spaces being filled without any G-fibers, e.g. with corresponding EFA-smallest particles, in case of a dense-packed disposition of any components participating in the material mixture.

$$B_S = 3 \cdot D = 3 \cdot \beta \cdot D_0; D = \beta \cdot D0$$

$$H_S = 3^{0,5} \cdot D = 3^{0,5} \cdot \beta \cdot D_o;$$

$$T_S = \alpha \cdot D_o$$

$$D_{Cq} \approx 1{,}225 \cdot D_C \text{ (empirical value of the swelling)}$$

-continued $D_{Cq} \leq 2D - D_o$ (condition of equidistance for the dense-packed triagonal disposition of the large binder particles and the surrounded C-fibers in the swollen state of the C-fibers at full reception of deposit water)

or converted into the defining equation for $\beta$ $$D_{Cq} \leq 2\beta \cdot D_o - D_o \longrightarrow \beta \geq 0.5 \left(1 + \frac{D_{Cq}}{D_o}\right); \quad (1)$$

$$\text{resp. } \beta \geq 0.5 \left(1 + 1.225 \cdot \frac{D_C}{D_o}\right)$$

Volume Relations Described by Volume Filling Factors f $$f_C = \frac{\Delta V_C}{\Delta V_S} = \frac{(1 + 4/4)\pi/4 \, D_C^2 \cdot a \cdot D_o}{3D3^{0.5}D \cdot aD_o} = \frac{0.3023}{\beta^2}\left(\frac{D_C}{D_o}\right)^2 \quad (2)$$

$$f_G = \frac{\Delta V_G}{\Delta V_S} = \frac{(10 + 4/2)\pi/4 \, D_G^2 \cdot aD_o}{3D3^{0.5}D \cdot aD_o} = \frac{1.814}{\beta^2}\left(\frac{D_G}{D_o}\right)^2 \quad (3)$$

$$f_G \approx 0.005 \longrightarrow \frac{D_G}{D_o} = \beta \frac{0.05^{0.5}}{1.814^{0.5}} = \beta \cdot 0.166 \quad (3')$$

$$f_B = f_Z + f_E = f_Z + f_{EG} + f_{EM} + f_{EK} \quad (4)$$

(binder particles as a whole)

$$f_Z + f_{EG} = \frac{\Delta V_{Do}}{\Delta V_S} = \frac{(2 + 4/2)\pi/6 \, D_o^3}{3D3^{0.5}D \cdot aD_o} = \frac{0.4031}{\beta^2 \cdot a} \quad (5)$$

(Z/EG-large particles)

$$f_{EM} + f_{EK} = \frac{\Delta V_d}{\Delta V_S} = \frac{(4 + 4/2)\pi/6 \, d^3}{3D3^{0.5}D \cdot aD_o} = \quad (6)$$

$$\frac{\pi}{3 \, 3^{0.5}\beta^2 \cdot a}\left(\frac{d}{D_o}\right)^3 = \frac{0.6047}{\beta^2 \cdot a}\left(\frac{d}{D_o}\right)^3$$

(EFA-medium and smallest particles)

$$d \leq D_o[(a^2 + \beta^2)^{0.5} - 1] \text{ (limit of the zone of slipping spheres) } (7)$$

$$f_{CW} = \frac{(1 + 4/4)\pi/4(D_{Cq}^2 - D_C^2) \cdot aD_o}{3D3^{0.5}DaD_o} = \frac{\pi/2 \, D_C^2 \cdot 0.5}{3 \, 3^{0.5} \cdot \beta^2 \cdot D_o^2} = \quad (8)$$

$$\frac{0.1512}{\beta^2}\left(\frac{D_C}{D_o}\right)^2 \text{ (C-fiber deposit water)}$$

Condition for dense-packed disposition (9)

$$f_C + f_Z + f_{EG} + f_{EM} + f_{EK} + f_{CW} + f_{HW} + f_G = 1.0$$

↑ particle encasing water

More Precise Definition of the Volume Filling Factors

That what applies for the overall volume of the plate is intended to go for the volume element $\Delta V_S$, as well.

$$\frac{V_Z + V_E}{V_{ges}} = \frac{V_Z + V_E}{V_Z + V_{EG}} \cdot \frac{V_Z + V_{EG}}{V_{ges}} = \frac{V_Z}{V_Z} \cdot$$

$$\frac{1 + V_E/V_Z}{1 + V_{EG}/V_Z} \cdot (f_Z + f_{EG}) = f_Z + f_{EG} + f_{EM} + f_{EK}$$

$V_{EG} = 0.15 \cdot V_E$ = volume of the EFA-large particles with $40 \, \mu m < \phi_{EG} < 90 \, \mu m$ $$\frac{V_E}{V_Z} = \frac{G_E}{G_Z} \cdot \frac{\gamma_Z}{\gamma_E} = 0.18 \cdot \frac{3.2}{2.4} = 0.24 = \frac{f_E}{f_Z}$$

↑ average value according to patent claim 4
↑ ratio of the specific gravity for cement and EFA $$(f_Z + f_{EG}) + (f_{EM} + f_{EK}) = \frac{1 + 0.24}{1 + 0.15 \cdot 0.24} (f_Z + f_{EG}) =$$

$$1.1969 \, (f_Z + f_{EG})$$

$$f_{EM} + f_{EK} = (1.1969 - 1) \cdot (f_Z + f_{EG}) = 0.1969 \, (f_Z + f_{EG}) \quad (10)$$

↑ s · (5)

$$\frac{0.0794}{\beta^2 \cdot a} = 0.85 \, f_E$$

$$f_E = \frac{0.0934}{\beta^2 \cdot a} = \left(\frac{f_{EM} + f_{EK}}{0.85}\right) \quad (11)$$

$$f_{EG} = 0.15 \, f_E = \frac{0.0140}{\beta^2 \cdot a} \quad (12)$$

$$f_Z = f_Z + f_{EG} - f_{EG} = \frac{0.4031 - 0.0140}{\beta^2 \cdot a} = \frac{0.3891}{\beta^2 \cdot a} = \quad (13)$$

$$\frac{f_E}{0.24} = \frac{0.0934}{0.24 \, \beta^2 \cdot a} = \frac{0.3891}{\beta^2 \cdot a}$$

(o.U.)

$$f_{CW} + f_{HW} = f_{WZ} + f_{WE} \quad (14)$$

↑ ↑ ↑ ↑ supplementing hydration water proportion for complete EFA-reaction
↑ ↑ ↑ hydration water proportion for cement
↑ ↑ encasing water
↑ deposit water (see (8))

$$f_{WZ} = \frac{V_{WZ}}{V_{ges}} = \frac{V_{WZ}}{V_Z} \cdot \frac{V_Z}{V_{ges}} = \frac{V_{WZ}}{V_Z} \cdot f_Z$$

$$f_{WE} = \frac{V_{WE}}{V_{ges}} = \frac{V_{WE}}{V_E} \cdot \frac{V_E}{V_{ges}} = \frac{V_{WE}}{V_E} \cdot f_E$$

$$\frac{V_{WZ}}{V_Z} = \frac{G_{WZ}}{G_Z} \cdot \frac{\gamma_Z}{\gamma_W} = W_Z \frac{\gamma_Z}{\gamma_W} = W_Z \cdot 3.2$$

↑ ratio of the specific gravities for cement and water $0.375 \leq W_Z \leq 0.45$ -continued $$\frac{V_{WE}}{V_E} = \frac{G_{WE}}{G_E} \cdot \frac{\gamma_E}{\gamma_W} = W_E \frac{\gamma_E}{\gamma_W} = 0{,}12 \cdot \frac{2{,}4}{1{,}0} =$$

↑ ratio of the specific gravities for *EFA* and water

↓ $W_E \approx 0{,}12$ $$f_{WZ} + f_{WE} = W_Z \cdot 3{,}2 \cdot f_Z + W_E \cdot 2{,}4 \cdot f_E \quad (15)$$
$$f_E = 0{,}24 f_Z$$

From condition (9) for dense-packed disposition follows on the basis of the volume filling factors (10) to (15)

$$f_C + f_Z + f_E + f_{WZ} + f_{WE} + f_G = 1 \quad (1)$$

and therefrom with the encasing water factor $\beta_{min}$ pregiven according to (1) and the filling factors $f_C$ and $f_G$ given according to (2) and (3) a defining equation for the encasing water factor $\alpha$:

$$\frac{0{,}3023}{\beta^2}\left(\frac{D_C}{D_o}\right)^2 + f_G + \underbrace{\frac{0{,}3891}{\beta^2 \cdot \alpha}}_{(f_Z)} + \underbrace{\frac{0{,}0934}{\beta^2 \cdot \alpha}}_{(f_E)} + W_Z \cdot 3{,}2 \cdot f_Z + \quad (17)$$

↑ (pregiven ≈ 0.05)

$$W_E \cdot 2{,}4 \cdot f_E = 1$$

or combined differently:

$$\frac{0{,}3023}{\beta^2}\left(\frac{D_C}{D_o}\right)^2 + f_G + \frac{0{,}3891}{\beta^2 \cdot \alpha}(1 + 3{,}2 \cdot W_Z) +$$

$$\frac{0{,}0934}{\beta^2 \cdot \alpha}(1 + 2{,}4 \cdot \underbrace{W_E}_{\approx 0{,}12}) = 1$$

or transformed:

$$\alpha\left[1 - \frac{0{,}3023}{\beta^2}\left(\frac{D_C}{D_o}\right)^2 - f_G\right] =$$

$$\frac{1}{\beta^2}[0{,}3891 + 0{,}0934 + 1{,}2451\, W_Z + 0{,}0269]$$

and finally $$\alpha = \frac{0{,}5094 + 1{,}2451\, W_Z}{\beta^2[1 - f_G] - 0{,}3023\left(\frac{D_C}{D_o}\right)^2} \quad (18)$$

If equation 18 is calculated several times for various parameter variations $D_C/D_o$, $W_Z$, $\beta \geq 0.5(1 + 1.225\, D_C/D_o)$, with the conditions for the water fill factors $1 < \alpha < \bar{\beta}$; $1 < \beta < \bar{\beta}$; $\bar{\beta} \approx 1.22$ to $1.3$ for stable particle water jackets for mixing and forming processes, and with the substance mixture in the half-dry to wet-moist state, for various values $0.375 < W_Z < 0.45$, as a condition for a cement stone having no or only a few capillary pores, while obeying the triagonal grain condition as a further specified limitation for the water jacket factor $\beta_{min}$, then logical solutions are possible only in the following narrow range:

$$0.9 < D_C/D_o < 1.1$$

or $$1.1 < D_{cq}/D_o < 1.35.$$

For the case where glass fibers are added to a limited extent, if $f_G = 0.05$ is kept constant and $f_C$ is sought to be as large as possible, then it follows from equation 3 that:

approximately $0.175 < D_G/D_o < 0.195$.

EXAMPLE NO. 1

(Complete Calculation For $D_G/D_o = 1$)

(a) $W_Z = 0{,}375$; $\beta = 1{,}113$; $\alpha = 1{,}116$; $f_G = 0{,}05$;
from (2): $f_C = 0{,}244$;
from (3'): $D_G/D_o = D_G/D_C = 0{,}185$ (13 μm < $D_G$ < 17 μm)
from (10): $f_{EM} + f_{EK} = 0{,}0574$;

from (6) with (10): $d/D_o = 0{,}5083$ ⎫
from (7): $d_{max}/D_o = 0{,}5761$ ⎬ $f_{EM} + f_{EK}$ can be housed in the zone for slipping spheres ⎭ form (13): $f_Z = 0{,}2815$;
from (11): $f_E = 0{,}0676$;
from (15): $f_{WZ} + f_{WE} = 0{,}3573$;
from (8): $f_{CW} = 0{,}1221$;
from (14): $f_{HW} = 0{,}2355$;

$d_{max} = 40$ μm ⟶ $D_{omin} = 69$ μm non-critical diameter distribution at *EFA*-addition
ca. 70 μm ≤ $D_o$ ≤ 90 μm
ca. 70 μm ≤ $D_C$ ≤ 90 μm $$\frac{f_{CW}}{f_{WZ} + f_{WE}} = 0{,}3417 \text{ (34\% of the mixing water as a C-fiber deposit water)}$$

Control according to (16)
$0.244 + 0.2815 + 0.0676 + 0.3573 + 0.05 = 1.0004$
(o.k.)

(b) $W_Z = 0{,}45$; $\beta = 1{,}113$; $\alpha = 1{,}223$; $f_G = 0{,}05$;
from (2): $f_C = 0{,}244$;
from (3'): $D_G/D_o = D_G/D_C = 0{,}185$ (11 μm > $D_G$ > 17 μm)
from (10): $f_{EM} + f_{EK} = 0{,}0524$;

from (6) mit (10): $d/D_o = 0{,}5082$ ⎫
from (7): $d_{max}/D_o = 0{,}6536$ ⎬ $f_{EM} + f_{EK}$ can be housed in the zone for slipping spheres ⎭ from (13): $f_Z = 0{,}2568$;
from (11): $f_E = 0{,}0616$;
from (15): $f_{WZ} + f_{WE} = 0{,}3875$;
from (8): $f_{CW} = 0{,}1221$;
from (14): $f_{HW} = 0{,}2654$;

$d_{max} = 40$ μm ⟶ $D_{omin} = 61$ μm non-critical diameter distribution at *EFA*-addition
ca. 61 μm ≤ $D_o$ ≤ 90 μm
ca. 61 μm ≤ $D_C$ ≤ 90 μm $$\frac{f_{CW}}{f_{WZ} + f_{WE}} = 0{,}315 \text{ (32\% of the mixing water as a C-fiber deposit water)}$$

Control according to (16):

-continued 0.244 + 0.2568 + 0.0616 + 0.3875 + 0.05 = 0.9999
(o.k.)

EXAMPLE NO. 2

(Full Calculation For $D_C/D_o = 1.1$ (a) $W_Z = 0.375; \beta = 1.174; \alpha = 1.03; f_G = 0.05;$
from (2): $f_C = 0.2654;$
from (3'): $D_G/D_o = 0.195; D_G/D_C = 0.177$
$(14 \mu m < D_G < 187 \mu m)$
from (10): $f_{EM} + f_{EK} = 0.0559;$ from (6) with (10): $d/D_o = 0.5083$ ⎫ $f_{EM} + f_{EK}$ is within the
from (17): $d_{max}/D_o = 0.5618$ ⎭ intervolume of the large particles from (13): $f_Z = 0.2741;$
from (11): $f_E = 0.0658;$
from (15): $f_{WZ} + f_{WE} = 0.3479$
from (8): $f_{CW} = 0.1327;$
from (14): $f_{HW} = 0.2152;$
$d_{max} = 40 \mu m - D_{omin} = 71 \mu m$
non-critical diameter distribution at EFA-addition
ca. 70 $\mu m \leq D_o \leq 90 \mu m$
ca. 77 $\mu m \leq D_C \leq 100 \mu m$ $$\frac{f_{CW}}{f_{WZ} + f_{WE}} = 0.3814 \text{ ($\infty$ 38\% of the mixing water as a C-fiber deposit water)}$$

Control according to (16):
0.2654 + 0.2741 + 0.0658 + 0.3479 + 0.05 = 1.003
(o.k.)

(b) $W_Z = 0.45; \beta = 1.174; \alpha = 1.113; f_G = 0.05;$
from (2): $f_C = 0.2654;$
from (3'): $D_G/D_o = 0.195$ (13 $\mu m < D_G < 18 \mu m$)
from (10): $f_{EM} + f_{EK} = 0.0518;$
from (6) with (10): $d/D_o = 0.5083$
from (7): $d_{max}/D_o = 0.6177$
from (13): $f_Z = 0.2536;$
from (11): $f_E = 0.0609;$
from (15): $f_{WZ} + f_{WE} = 0.3827;$
from (8): $f_{CW} = 0.1327;$
from (14): $f_{HW} = 0.2500;$ $d_{max} = 40 \mu m \longrightarrow D_{omin} = 65 \mu m$ non-critical diameter distribution at EFA-addition
ca. 65 $\mu m \leq D_o \leq 90 \mu m$
ca. 72 $\mu m \leq D_C \leq 100 \mu m$ $$\frac{f_{CW}}{f_{WZ} + f_{WE}} = 0.3467 \text{ (35\% of the mixing water as a C-fiber deposit water)}$$

Control according to (16):
0.2654 + 0.2536 + 0.0609 + 0.3827 + 0.05 = 1.01
(within the scope of calculating exactness o.k.)

It may be taken from the said exemplary calculations which high volume proportions of the plate are possible for the fiber-re-inforcing component cellulose fibers, also at the addition of EFA-binder additives to these building material plates of relatively high bending strength, which at dense packed forming are water-tight, resistant to acid, non-inflammable and owing to the high proportions of cellulose fibers highly inhibiting as regards thermal flow and sound-insulating as well as non-susceptible to brittle fracture, when the mixing and forming provisions according to the invention and the thus possible realization of the dimensioning and dosing provisions according to the invention, prescribed in detail by the definition and control formulae (1) to (18) are being kept to.

The addition of the EFA binder which for the reasons given above is very advantageous for securing a constancy in longtime quality for the said building material plates, or the addition of equivalent materials having the same chemical properties of reaction to the cement powder then is in need of a cement grinding fineness with grain sizes $D_o$ having predominantly dimensions within the range of from 65 $\mu m < D_o < 90$ to 100 $\mu m$ and of a suitable C-fiber starting material from which C-fiber flakes can be prepared by means of known crushing and grinding techniques, whose single C-fiber lengths is about 1 mm to some mm and whose diameter distribution $D_C$ resp. $D_{Cq}$ in the air-dry resp. wet-moist swollen state meets the dimensional condition $$0.9 < D_C/D_o < 1.1$$

$$1.1 < D_{Cq}/D_o < 1.35$$

The accommodation of individual C fibers in a homogeneously distributed manner with binder stone enveloping on all sides, which then becomes possible, requires a metering in terms of volumetric proportions of the cellulose fibers when air dry in said mixture between 0.27 and 0.32, and when water swollen between 0.38 and 0.45, and further according to the equations:

$$0.22 < f_C < 0.27$$

$$0.27 < f_{Cq} < 0.38$$

where $$0.9 < D_C/D_o < 1.1$$

or $$1.1 < D_{Cq}/D_o < 1.35$$

The highest fiber addition, thus, is possible at the highest $D_C/D_o$-ratio. But this may only be increased beyond 1.1 when the weight ratio $W_Z$ of hydration water/cement is raised to a value $W_Z = G_{WZ}/G_Z > 0.45$, which unfortunately goes hand-in-hand with an increase of the capillary pore proportion of the binder stone. But this is impossible when water tightness of the building material plates is required.

For calculating example No. (1a) with $D_C/D_o = 1.0$ and $W_Z = 0.375; W_E = 0.12$, for which the illustration of disposition 2 is geometrically relatively correct, by the specific material weights $\gamma_Z = 3.2$ g/cm$^3$; $\gamma_E = 2.4$ g/cm$^3$; $\gamma_C = 1.49$ g/cm$^3$; $\gamma_G = 2.6$ g/cm$^3$; $\gamma_W = 1.0$ g/cm$^3$ recalculations of volume proportions to weight proportions are made which are more likely to be needed for dosing purposes.

TABLE I

| material component | $f_i$ | $\gamma_i f_i$ | $\gamma_i f_i / \Sigma \gamma_i f_i$ | C-fiber-based weight proportions |
|---|---|---|---|---|
| C-fiber | 0.244 | 1.49 × 0.244 = 0.3636 | 19.0% | 1.0 |
| G-fiber | 0.05 | 2.6 × 0.05 = 0.130 | 6.8%* | 0.36 |
| cement | 0.281 | 3.2 × 0.281 = 0.8992 | 47.0% | 2.47 |
| EFA | 0.068 | 2.4 × 0.068 = 0.1632 | 8.5% | 0.45 |
| deposit water | 0.122 | 1.0 × 0.122 = 0.1220 | 6.4% | 0.34 |
| encasing water | 0.235 | 1.0 × 0.235 = 0.2350 | 12.3% | 0.65 |

TABLE I-continued

| material component | $f_i$ | $\gamma_i f_i$ | $\gamma_i f_i / \Sigma \gamma_i f_i$ | C-fiber-based weight proportions |
|---|---|---|---|---|
| Σ | 1,000 | γ plate = 1,913 | 100% | 5,27 |

$\gamma_i$ = specific material weights
*When the G-fiber is omitted, the 5% volume proportion thereof is to be replaced by an increase of the binder particle volume and the water volume at a constant total water-binder value, i.e. by keeping to the desired capillary porosity.

The assumptions concerning the disposition of material mixture explained in the foregoing and the relative coordinations of particle and fiber dimensions and proportions of material mixture in the hydration-water moist plate, as evidenced by calculating examples allow the following supplementing statements:

About 28 to 38% of the entire hydration water are absorbed as a C-fiber deposit water and are prevented to evaporate too rapidly during hardening and setting of the form cake. This avoids the formation of setting cracks in the binder stone, which are usually formed in the marginal zones of such plates owing to too rapid water evaporation, virtually completely.

As the hydration gels at least penetrate the exterior moist spaces of the C-fibers, an "indenting" of the hardened binder stone with the cellulose fibers C is quasi resultant which virtually prevents the inflammability thereof in the hardened plate.

The volume proportion of the cellulose fibers, expressed by the volume filling factor $f_C$ of the dry cellulose fibers is within the range of from 0.22 to 0.27, while the volume proportion of the swollen and finally hardened cellulose fibers $f_{Cq}$ is within the range of from 0.33 to 0.40. This reduces the thermal conductivity of the building material plate as against the pure binder stone to a considerable extent, which increases the resistivity to fire of the product, as well. And the sound-insulating capacity is improved, as well.

The building material plate described in the foregoing is produced in the following way:

Raw materials containing cellulose fibers are rendered C-fiber flakes from single fibers having the thicknesses $D_C$ to $D_{Cq}$, dependent on the moisture content, by prior art crushing and grinding techniques. Preferably, the swell diameter $D_{Cq}$ may be controlled by taking random samples of fibers and enriching them with water, and by slightly compressing them thereafter and examining them under the microscope. Then, the volume element and weight-specific properties of the moist fibers and the deposit water saturation degree of the cellulose fibers are determined.

When the degree of water saturation of the cellulose fibers to be processed by mixing techniques and the gravity weight of the air-moist cellulose fibers ($\gamma_C$ 1.49 g/cm³) are known, by the actual gravity weight of the moist fiber the moist fiber weight necessitated for a pre-given overall material mixture volume can be determined in accordance with the volume element-volume filling factor $f_C$ resp. $f_{Cq}$, from which the required fiber quantity is resultant.

Based upon this dosage guide value (1.0), the weight proportions of the remaining material mixture components indicated in the last column of table 1 are resultant.

By taking into consideration the foregoing data as to dimensioning and dosage the cellulose fibers, the cement and EFA-particles are mixed by the aid of a mechano-pneumatic compulsory mixing step in a homogenizing mixing procedure. The compulsory mixing assembly must allow a high-turbulence mutual bombardment of the introduced cellulose fibers, the cement and EFA-particles.

What is of momentum is that any mixing components are added in the dry resp. air-moist—at the most—state.

Owing to the above data as to dimensioning the structure illustrated in an idealized manner in FIG. 2 is almost achieved, as due to van Waals' forces, electrostatic forces and/or fluid-bridge formation due to fluid droplets possibly leaving the air-moist cellulose flakes the particles are mutually fixed.

The compulsory mixing step can be carried out by e.g. a cross hammer mill with circumferential sieves. One may think of appropriately subsequented cross hammer mills of different sizes and different mesh forms and sizes of the circumferential sieves, which e.g. allow a precrushing of the starting materials containing cellulose fibers to C-material chips or even immediately to C-fiber flakes, and in a second crushing step in the same or another subsequented crushing assembly the admixture of the solid material particles, the latter penetrating the C-chips resp. C-fiber debris like small projectiles and thus dividing it into single fibers with interposed solid material particles. Such cross hammer mills with circumferential sieves are crushing organs and mechano-pneumatically acting mixing organs at the same time.

In a successive method step the mixture of solid material particles almost ideally mixed is freed from surplus suction and transport air which is necessitated by said crushing method and, thus, furnishes automatically the mechano-pneumatic mixing procedure at the same time.

In this conjunction a weir is conceivable in an apparatus embodiment, over which the mixture of solid particles is transported, the surplus transport air being able to escape in the forward or upward direction.

In a third method step, precisely enough water mist is added to the mixture of solid particles, during the vertical drop in the slightly turbulent suspended stream, that without flushing out particles, a quantity of hydration water is incorporated into the mixture that at least corresponds to the aforementioned dimensional specifications. That is, water jackets which are stabilized by the surface tension of the water are formed around the fibers and particles. A slight overdose of the water is harmless as long as no flushing out of solid particles takes place. Nor may any shift in the solid particles that destroys the homogeneity of the distribution be allowed to take place.

In accordance with an embodiment of the invention, hot water/steam, instead of ambient-tempered water mist, can be incorporated. This alternative facilitates the entry of water, and, if somewhat lesser final strengths of the molded elements after the 28-day curing of the binder stone are acceptable, this alternative increases the setting speed of the mixture of binder and water following the concluding compulsory molding of the molded building material element, and thus makes its handling much easier, because it is less vulnerable to damage.

Thereafter, the material in any case is subjected to the known techniques of a discharge and trickling deformation, in which e.g. it is deposited on a forming belt and subsequently formed by compression (e.g. plate pressing).

In case less demands are made to weatherability, fire resistivity, bending and tensile strengths, contracting and elongating behaviour of the building material plates, one can do without compression forming, and a plate having relatively many air pores can be obtained by only joggling the mixture obtained by the above method and subjecting it to a slight calibrating pressing.

According to another embodiment the third method step is substituted in case of very thin-shell building material plates. When doing so, the dry solid material particle mixture is trickled onto a forming belt coated previously by a corresponding water film. Owing to the resulting capillaries of the solid material debris the water is in part absorbed, without demixing the almost ideal mixture and is finally distributed homogeneously during the later form pressing.

The building plate manufactured according to the method of the invention shows excellent mechanical properties which come very close to those of asbestos building material plates. The load-bearing capacity corresponds e.g. to ¾ of the value of asbestos fiber cement plates which are capable of bearing high loads.

The features of the invention can be of significance both individually and in any combination whatsoever for putting the invention into reality.

Figure 4:
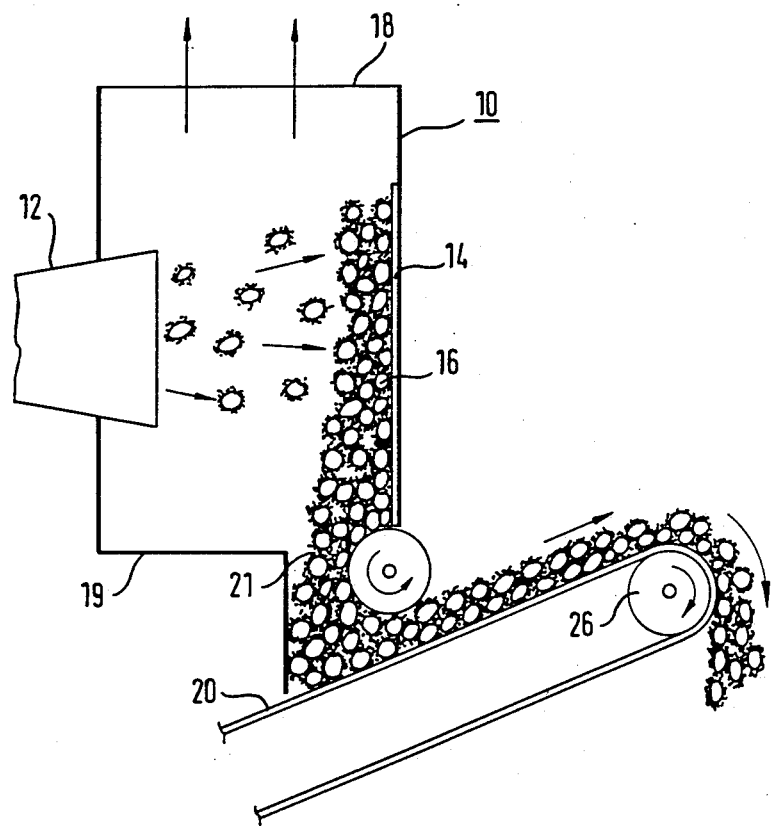
FIG. 4 is a schematic illustration of the manufacture of asbestos-free building material plates according to the invention.
Figure 5:
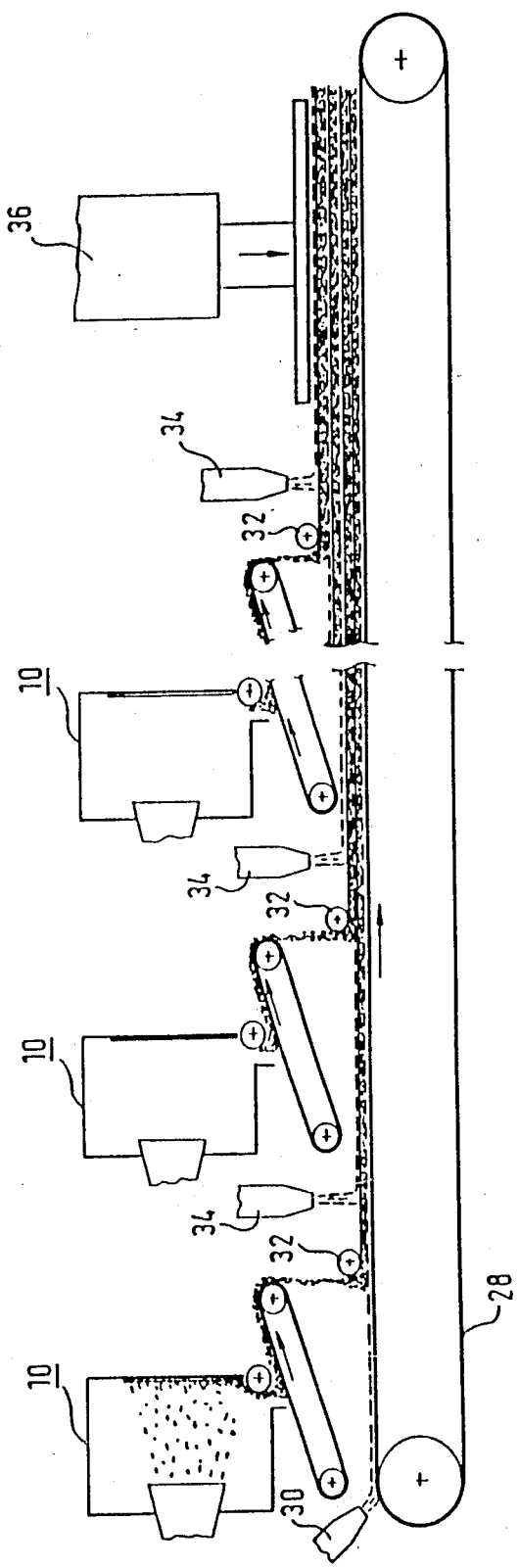
FIG. 5 is a schematic illustration of a further method for manufacturing asbestos-free building material plates according to the invention.

FIGS. 4 and 5 illustrate a scheme for the manufacture of asbestos-free building material plates for another method.

According to FIG. 4 a dosage means 10 for the particle mixture of solid material 16 shows a horizontally swingable outlet means 12 of the mechano-pneumatically working mixing organ, from which the quasi-homogeneous solid material particle mixture 16 is blown out through a pneumatic transporting procedure, without causing any demixing, and captured in housing 18 comprising a baffle plate 14 arranged oppositely to outlet means 12. Owing to the pneumatic feeding of particles, in case of a draw-off of transport surplus air in the upward direction, a very densely packed particle upholster is forming on said baffle plate 14. If there is any slot 21 in the bottom plate 19 of the housing the compressed particle mixture can be deposited by dosages on a transport belt 20, dependent on the size of said slot 21 and the speed of transport belt 20 running thereunder. A pressing roll 22 renders the layer thickness of the particle mixture deposited on said transport belt 20 uniform. At the end of transport belt 20 the slightly pre-compressed layer of solid material particles falls onto a forming belt 26, essentially without any demixing and dosed by time units.

In FIG. 5 several dosing means 10 for mixtures of solid material particles are disposed along a forming belt 28. Due to this a building material plate of a determined thickness can most advantageously be built up by several layers. For doing so, a water film dosed as regards thickness is firstly deposited by means of a spraying or mist wetting means 30 onto forming belt 28. On said thin water film a layer of solid material particles of a dosed thickness, which is to be coordinated to the amount of water in said water film, is trickled by a first dosing means 10, which layer is thereafter rendered uniform by a pressing roll 32 with respect to thickness and slightly pre-compressed. Subsequently, a thin water film which is not broken up yet at being applied onto the layer of solid particles is laid by means of a controlled mist wetting device 34 so carefully onto the layer of solid material, quasi like a foil skin, at correspondingly harmonized falling rates of water mist and forming belt transporting speeds that at the following suction procedure no surroundings or only insubstantial surroundings of surface particles take place.

The regularity of an undamaged water mist between the exit of the water mist and the layer of solid material particles laying on forming belt 28 can be achieved by e.g. the addition of tensides in the dosage required. At the same time fluid substances for regulating the setting time can be introduced through the water mist for the respectively necessary pairing of dosage of binder particles and hydration water. Then, the method steps described above are repeated till the desired numbers of the layer of solid material particles-water film pairings are laid upon each other. Thereafter, the building material plate can be brought by prior art feeding techniques not shown here under a forming press 36 and can be formed by the amount of necessary pressures applied to at least a moist compression which is quasi air-pore-free, dependent on the desired degree of compression.

I claim:

1. A method of making an asbestos-free building material plate, comprising the steps of:
    (a) mechano-pneumatically mixing in a substantially dry state, fiber reinforcing materials comprising mainly cellulose fibers with binder particles comprising cement, the ratio of diameters of the cellulose fibers when air dry to the diameters of the binder particles being between 0.9 and 1.1 and the ratio of the diameters of the cellulose fibers when water swollen to the diameters of the binder particles being between 1.1 and 1.35, the mixing being continued until a quasi-homogeneous uniform distribution of components is achieved;
    (b) densifying said quasi-homogeneous mixture to the extent possible by removing surplus air resulting from said mixing;
    (c) subjecting said densified mixture to a weakly turbulent mechano-pneumatic suspending steam/rolling mixture with water mist present in at least an amount sufficient that the weight ratio of water to cement can subsequently be adjusted to between 0.375 and 0.45 in subsequent operations, the amount of water being limited by the amount which would create a possibility of dehomogenizing the mixture during trickle charging in a subsequent forming assembly;
    (d) preforming the mixture of step (c) depending on the desired utilization of the building materials, either compressed in its dense packed form or joggled and slightly compressed only in a calibrating mode by allowing cavities resulting from the mixture, with adjustment of the weight ratio of water to cement to between 0.375 and 0.45.

2. The method of claim 1, wherein said binder particles additionally comprise very fine glass spheres, the quantity distribution of said glass spheres being about 15% of spheres having a diameter between about 40 and 90 microns, approximately equal to the diameters of the binder particles, about 35% of spheres having a diameter between about 10 and 40 microns, and about 50% of spheres having a diameter less than about 10 microns.

3. The method according to claim 1 or 2, wherein said water mist contains liquifiers or chemical additives which are non-detrimental to binder hydration and which reduce the surface tension of water to such an extent that the mist droplets are reduced in size to an extent whereby the entering of water droplets between particles present in the mixture and within cavities of the cellulose fibers is facilitated.

4. The method of claim 1 or 2, wherein said water mist is in the form of hot steam.

5. The method according to claim 1 or 2, wherein said quasi-homogeneous mixture is densified by pneumatically transporting said mixture over a weir, enabling the surplus transport air to escape in the forward and upward direction.

6. The method according to claim 1 or 2, wherein glass fibers are added to said fiber reinforcing materials and said binder particles being mechano-pneumatically mixed in step (a), the ratio of the diameter of said glass fibers to the diameter of said binder particles being 0.175 to 0.195, and the ratio of the diameters of said glass fibers to the diameters of said cellulose fibers when air dry being from about 0.16 to 0.22.

7. A method for making a building material plate, comprising the steps of:
   (a) mechano-pneumatically mixing in a substantially dry state, fiber reinforcing materials comprising cellulose fibers with binder particles comprising cement, the ratio of the diameters of said cellulose fibers when air dry to the ratio of the diameters of said binder particles being from 0.9 to 1.1, and the ratio of the diameters of said cellulose fibers when water swollen to the ratio of diameters of said binder particles being from 1.1 to 1.35, and continuing the mixing until a quasi-homogeneous uniform distribution of components is achieved;
   (b) depositing said quasi-homogeneous mixture on a forming belt having a water film coated thereon, via at least one dosing means, such that a first stream of particles trickle down onto said water film.

8. The method of claim 7, wherein the particles on said water film are coated by an additional water film, and further particles are trickled down onto said additional water film to form a further layer.

9. The method of claim 7, wherein said particles on said water film are rendered more uniform by a pressing roll, before the coating by said additional film.

10. The method of claim 8 or 9, wherein said dosing means comprises a horizontally swingable outlet means of the means for the mechano-pneumatic mixing, and a housing having a baffle plate which is disposed opposite to said outlet means, and a slot in the vicinity of said baffle plate, and a transport belt below said slot, whereby said quasi-homogeneous mixture may be transported from said outlet means to said baffle plate, and thereafter transported from said baffle plate through said slot to said transport belt, at a rate depending on the size of said slot and the speed of said transport belt.

11. The method according to claim 8 or claim 9, wherein the water coating on said forming belt comprises surface active agents and substances regulating binder setting time.

12. The method of claim 2, wherein the weight ratio of glass spheres to cement binder particles plus glass spheres is about 0.14 to 0.17, and the weight ratio of glass spheres to cement binder particles is about 0.16 to 0.20.

13. The method of claim 2, wherein the total water added $= (0.375$ to $0.45)G_Z +$ about $0.12G_E$, where $G_Z$ is the weight of said cement binder particle and $G_E$ is the weight of said glass spheres.

14. The method of claim 1 or 2, wherein the volume proportion of the cellulose fibers when air dry in said material mixture is between 0.27 and 0.32, and the volume proportion of said cellulose fibers when water swollen in said material mixture is between 0.38 and 0.45.

15. The method according to claim 1 or 2, additionally comprising the step of adding substantially alkali resistant glass reinforcment fibers to said binder particles, said glass fibers having a diameter which is between 0.175 and 0.195 times the diameter of said binder particles, and between 0.16 and 0.22 times the diameter of said cellulose fibers when air dry, the volume proportion of glass fibers in said material mixture being about 0.05, and the sum of the volume proportions of cellulose fibers when air dry and glass fibers in said mixture being between about 0.27 and 0.32, with the sum of the volume proportions of cellulose fibers when water swollen and glass fibers being between about 0.38 and 0.45.

* * * * *